United States Patent [19]

Katoh et al.

[11] Patent Number: 5,414,463
[45] Date of Patent: May 9, 1995

[54] VIDEO CAMERAS CAPABLE OF SWITCHING AN ASPECT RATIO AND VIEW FINDERS FOR USE IN THE SAME

[75] Inventors: Minoru Katoh, Katsuta; Kotaro Kawamura; Hidenobu Katayori, both of Mito, all of Japan

[73] Assignee: Hitachi, Ltd., Tokyo, Japan

[21] Appl. No.: 943,413

[22] Filed: Sep. 9, 1992

[30] Foreign Application Priority Data

Sep. 18, 1991 [JP] Japan .................................. 3-237746
Sep. 27, 1991 [JP] Japan .................................. 3-248889

[51] Int. Cl.⁶ .......................................... H04N 5/225
[52] U.S. Cl. ............................... 348/207; 348/358
[58] Field of Search ............... 358/209, 224, 180, 335, 358/906; H04N 5/225, 3/223, 9/79, 9/09; 348/207, 333, 239, 240, 358, 17

[56] References Cited

U.S. PATENT DOCUMENTS

| | | | |
|---|---|---|---|
| 4,439,785 | 3/1984 | Leonard | 358/120 |
| 5,057,923 | 10/1991 | Matsuda | 358/180 |
| 5,107,334 | 4/1992 | Matsumoto | 358/180 |

FOREIGN PATENT DOCUMENTS

| | | |
|---|---|---|
| 400745 | 12/1990 | European Pat. Off. . |
| 0410489 | 1/1991 | European Pat. Off. . |
| 0411440 | 2/1991 | European Pat. Off. . |
| 0415707 | 3/1991 | European Pat. Off. . |
| 0469805 | 2/1992 | European Pat. Off. . |
| 0487092 | 5/1992 | European Pat. Off. . |
| 507297 | 10/1992 | European Pat. Off. . |
| 2092077 | 3/1990 | Japan . |
| 2226295 | 9/1990 | Japan . |
| 3016476 | 1/1991 | Japan . |
| 3-238985 | 10/1991 | Japan . |
| WO91/19387 | 12/1991 | WIPO . |

OTHER PUBLICATIONS

Nabeyama, Hiroaki et al., "All Solid State Color Camera with Single-Chip MOS Imager", IEEE Transactions on Consumer Electronics, vol. CE-27, Feb. 1981, pp. 40-46. (Provided in English).

*Primary Examiner*—Michael T. Razavi
*Assistant Examiner*—Tuan V. Ho
*Attorney, Agent, or Firm*—Fay, Sharpe, Beall, Fagan, Minnich & McKee

[57] ABSTRACT

A video camera capable of switching an aspect ratio and an electronic view finder for use in the same. In response to a switching control signal from an aspect ratio switching circuit, a video signal having a different degree of horizontal compression and an aspect switching control signal are fed to the view finder, a magnetic recording/reproducing circuit and an external device. The magnetic recording/reproducing circuit simultaneously records the video signal and the switching control signal. In reproduction, the magnetic recording/reproducing circuit reproduces and outputs the recorded switching control signal. In response to the switching control signal, the external device changes the deflection angle of a built-in display circuit and switches the aspect ratio to display the video signal. The electronic view finder receives a video signal having a different horizontal compression degree, and at the same time receives the aspect ratio switching control signal to operate the switching circuit in the view finder to change the deflection angle and hence switch the aspect ratio to display the image.

8 Claims, 13 Drawing Sheets

FIG. 6A
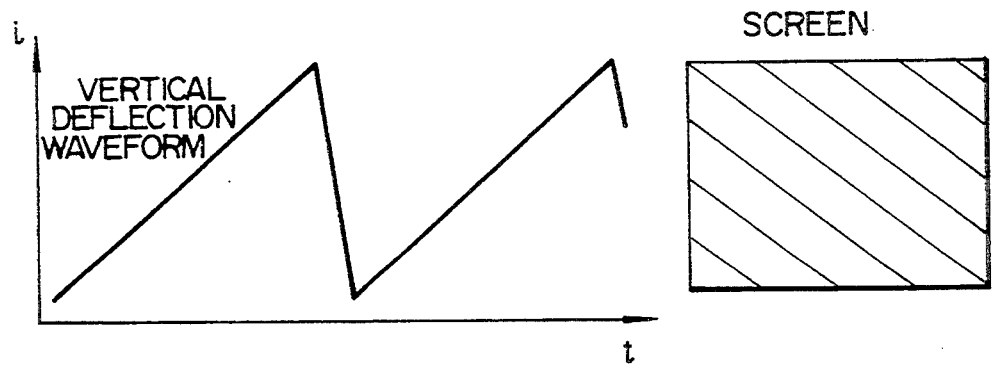
FIG. 6B
FIG. 6C
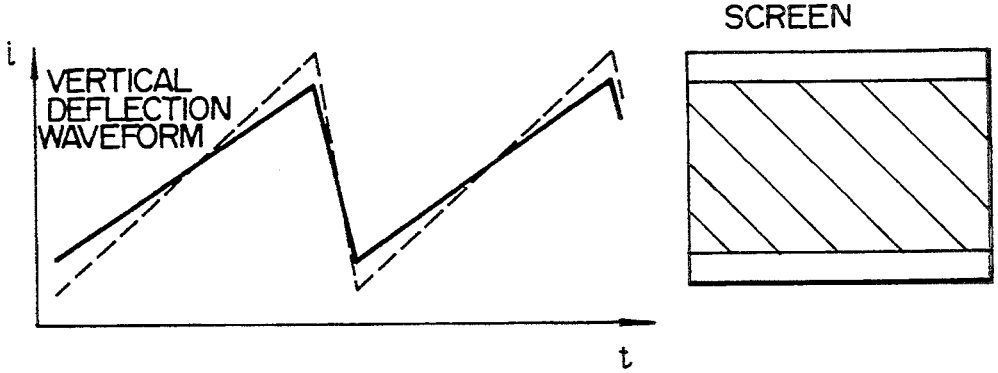
FIG. 6D

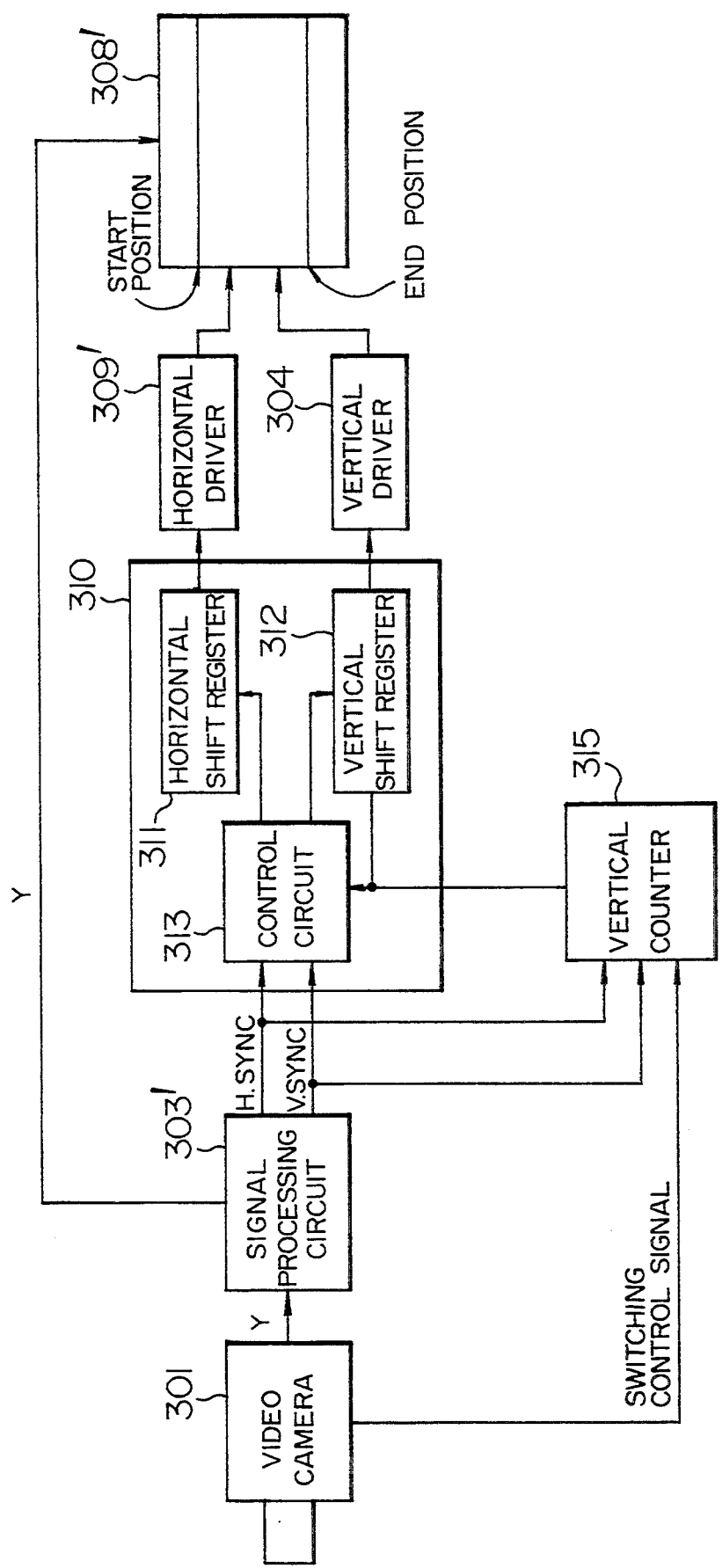

VIDEO CAMERAS CAPABLE OF SWITCHING AN ASPECT RATIO AND VIEW FINDERS FOR USE IN THE SAME

BACKGROUND OF THE INVENTION

The present invention relates to video cameras and electronic view finders for use in the same, and more particularly to a video camera which picks up the image of a subject at any one of a plurality of different aspect ratios and an electronic view finder for use in the video camera, having switchable aspect ratio.

A video camera outputs a video signal with an aspect ratio of 4:3 corresponding to that of the current television signal. An electronic view finder also outputs a picture or screen with an aspect ratio of 4:3. For example, such conventional technique is disclosed in IEEE Transactions Consumer Electronics, CE-27 February 1981, pp. 40–41.

SUMMARY OF THE INVENTION

The aspect ratio of a picture or screen for an NTSC signal is 4:3 while those of HDTV (High Definition Television) sets and movies are 16:9. Production of a video signal of this movie size with an NTSC video camera which has a built-in VTR (Video Tape Recorder) is possible by horizontal compression of the video signal. To this end, a conversion lens may be provided before the lens of the video camera or the aspect ratio of the image pickup device is changed or the manner of reading out a signal from the image pickup device is changed.

While in the reproduction system a video signal of movie size is obtained by expanding the compressed signal to an aspect ratio of 16:9, all the reproduction system circuits require a switching circuit for extending the ratio to 16:9, so that it is troublesome for the operator to switch all the switching circuits.

The picture or screen for NTSC signal has an aspect ratio of 4:3 while the movie has an aspect ratio of 16:9. When a video signal of movie size is produced by a video camera in the above manner, an image appearing on the electronic view finder would be compressed in the horizontal direction and appear extended vertically unless means for changing the aspect ratio are provided. In this case, in order to correctly reproduce the image picked up by the video camera in the electronic view finder, the aspect ratio in the view finder must be changed. It is troublesome for the operator to switch the electronic view finder in addition to the video camera.

It is an object of the present invention to provide a video camera with a built-in VTR in which all the associated circuits operate automatically at an aspect ratio of either 4:3 or 16:9 selected simply by the operator.

It is a further object of the present invention to provide an electronic view finder in which when the operator selects an aspect ratio of the video camera, an aspect ratio of the electronic view finder is simultaneously selected by a simple circuit.

In one aspect of the present invention to achieve the first object, means are provided for generating a switching control signal which switches the aspect ratio to a selected one when the operator selects an image pickup mode with an aspect ratio such as one for the movie size other than 4:3. The video camera outputs a video signal with a different aspect ratio in accordance with the switching control signal. This switching control signal is output to an external apparatus to thereby switch a destination circuit block automatically so as to operate at the selected aspect ratio.

When an external apparatus such as a television set receives the switching control signal, it selects an aspect ratio to reproduce an image, so that an image intended by the cameraman is reproduced. A magnetic recording/reproducing circuit for an image from a camera unit of a video camera simultaneously records the video signal and control signal and provides the video signal and control signal simultaneously in reproduction to thereby automatically select an aspect ratio of the television set.

In order to achieve the above further object, when the cameraman selects an image pickup mode other than that at an aspect ratio of 4:3, the electronic view finder receives a horizontally compressed video signal from the video camera and also a control signal indicative of selection of the aspect ratio. This control signal selects a vertical amplitude of the electronic view finder and hence an aspect ratio.

When the view finder receives the control signal, it selects an aspect ratio to thereby reproduce the image, so that an image intended by the cameraman is reproduced.

BRIEF DESCRIPTION OF THE DRAWINGS

FIGS. 6A–6D illustrate views useful for description of the selection of an aspect ratio.

FIG. 15 is a block diagram of another embodiment of the electronic view finder according to the present invention.

DESCRIPTION OF THE PREFERRED EMBODIMENTS

Figure 1:
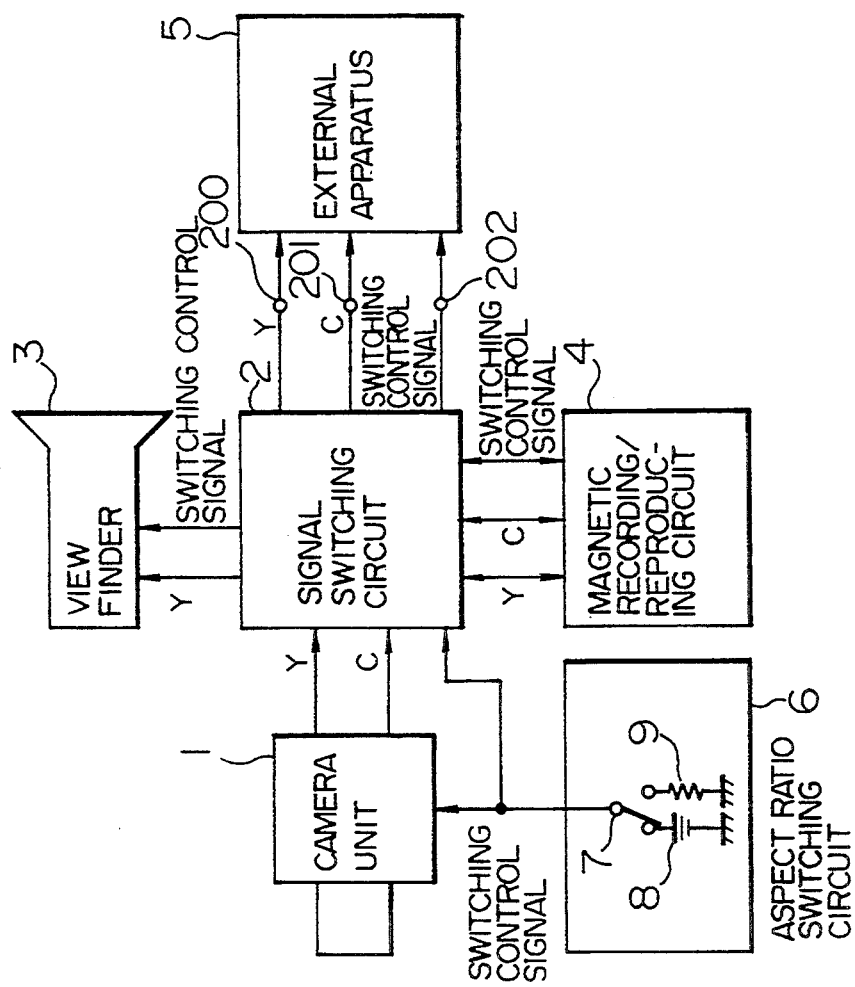
FIG. 1 is a schematic circuit diagram of an embodiment of a video camera according to the present invention.

Embodiments of the present invention will be described hereinafter with reference to the drawings. Like elements are identified with like reference numerals through all the Figures and further repeated descriptions thereof will be omitted.

FIG. 1 is a block diagram of a circuit of one embodiment of a video camera according to the present invention. In FIG. 1, reference numeral 1 denotes a camera unit; 2, a signal switching circuit; 3, a view finder; 4, a magnetic recording/reproducing circuit; 5, an external apparatus such as a television set; 6, an aspect ratio switching circuit; and 200, 201, 202, terminals through which a luminance signal (Y-signal), chrominance signal (C-signal), and a control signal are output to the external apparatus 5. The luminance signal and the chrominance signal are of the NTSC system. The pixel area of the image pickup device in the camera unit 1 has an aspect ratio of 16:9.

The video signal picked up by the camera unit 1 is output as an NTSC system luminance signal and a chrominance signal. Since there are two modes, that is, a camera mode in which the video signal picked up by the video camera is output directly and a reproducing mode in which the video signal reproduced by the magnetic recording/reproducing circuit 4 is output, one of the video signals to be output is selected by the signal switching circuit 2, the specified structure of which is shown in FIG. 2.

Figure 2:
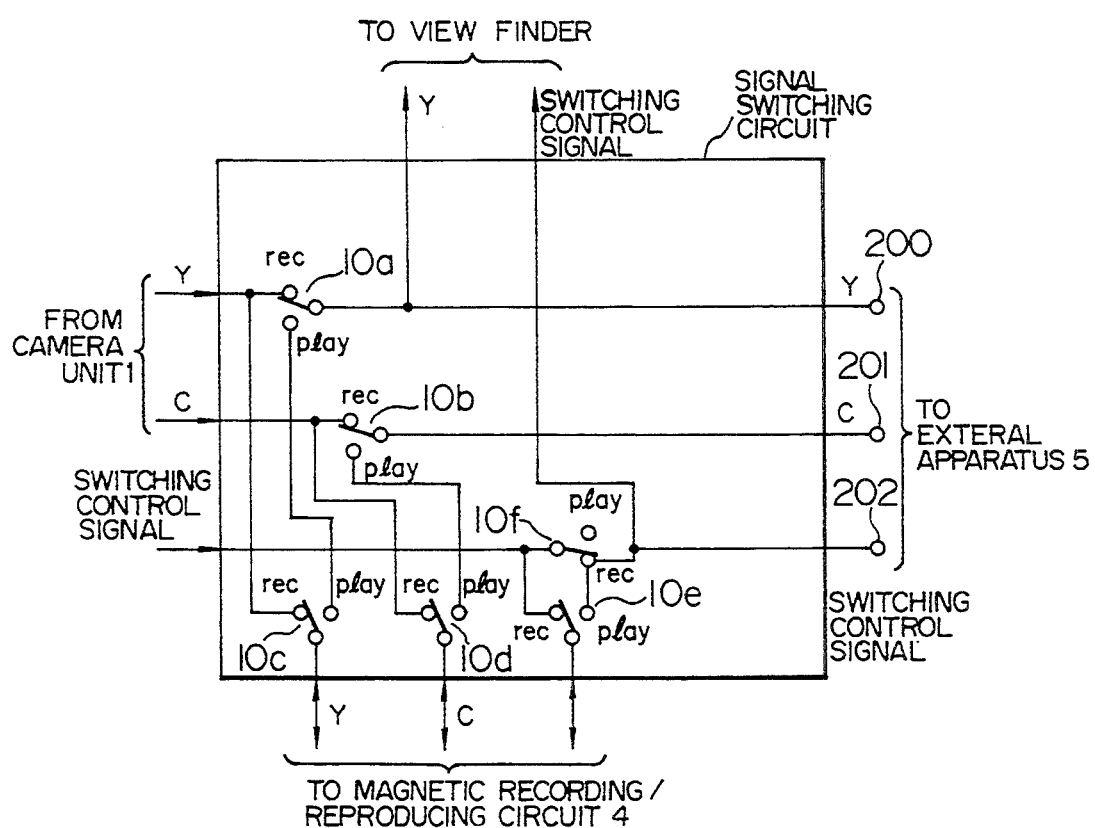
FIG. 2 is a schematic circuit diagram of a signal switching circuit.

In FIG. 2, reference characters 10a-10f denote switches, which are switched together such that they are switched to a "rec" side in the camera mode while they are switched to a "play" side in the reproducing mode. As a result, in the camera mode, the video signal output from the camera unit 1 is output to the view finder 3, magnetic recording/reproducing circuit 4, and external apparatus 5. In the reproducing mode, the video signal output from the magnetic recording/reproducing circuit 4 is output to the view finder 3 and external apparatus 5.

The view finder 3 is used to confirm whether the cameraman has picked up the image of a subject at a desired aspect ratio. The magnetic recording/reproducing circuit 4 records the image signal and reproduces it later. The external apparatus 5 includes a television set, a projector, etc.

Switching of the aspect ratio will be described in the camera mode.

A switching control signal for changing the aspect ratio is obtained by user's switching of the switch 7 for the aspect ratio switching circuit 6. When a power source 8 is connected by the switch 7, the switching control signal becomes high while when it is connected to a resistor 9, the switching control signal becomes low. When the switching control signal is low, a mode in which the aspect ratio is 4:3 is designated while when the switching control signal is high, a mode in which the aspect ratio is 16:9 is designated.

Figure 3A:
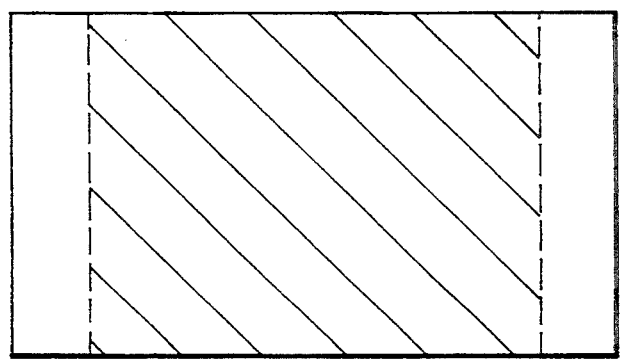
FIGS. 3A and 3B each show an area in which an image pickup device reads out a signal.
Figure 3B:
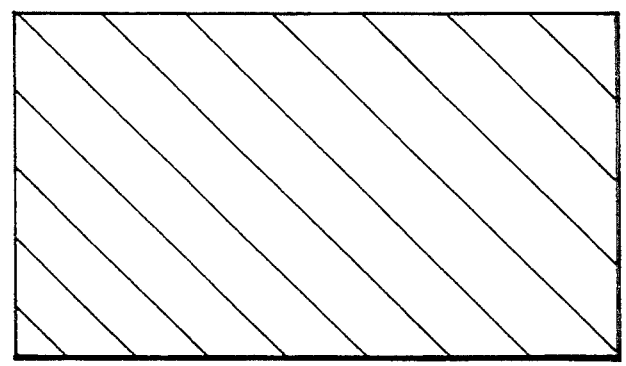

In order to record a video signal at an aspect ratio of 16:9 in the magnetic recording/reproducing circuit 4 which records/reproduces an image at an aspect ratio of 4:3, the camera unit 1 performs horizontal time compression on the video signal while when the video signal is reproduced by the view finder or a television set, the compressed video signal must be expanded. When the switching control signal becomes high, the camera unit 1 changes an area from which the signal is read out and a rate of reading out the signal, performs horizontal signal compression and outputs a video signal corresponding to an aspect ratio of 16:9. A specified example will be described with reference to FIGS. 3A-3B, which show an imaging region of the image pickup device 1 of the camera unit and having an aspect ratio of 16:9. The hatched portions of FIGS. 3A and 3B show an area where the signal is read out. FIG. 3A shows an area with an aspect ratio of 4:3 where a signal is read out while FIG. 3B shows an area with an aspect ratio of 16:9 where the signal is read out. While FIG. 3B shows a horizontally expanded area compared to FIG. 3A, the signal is readout in the same time as the horizontal scanning time in the NTSC system of FIG. 3A, so that horizontal signal compression is achieved. This will be described in more detail with reference to FIGS. 4A and 4B.

Figure 4A:
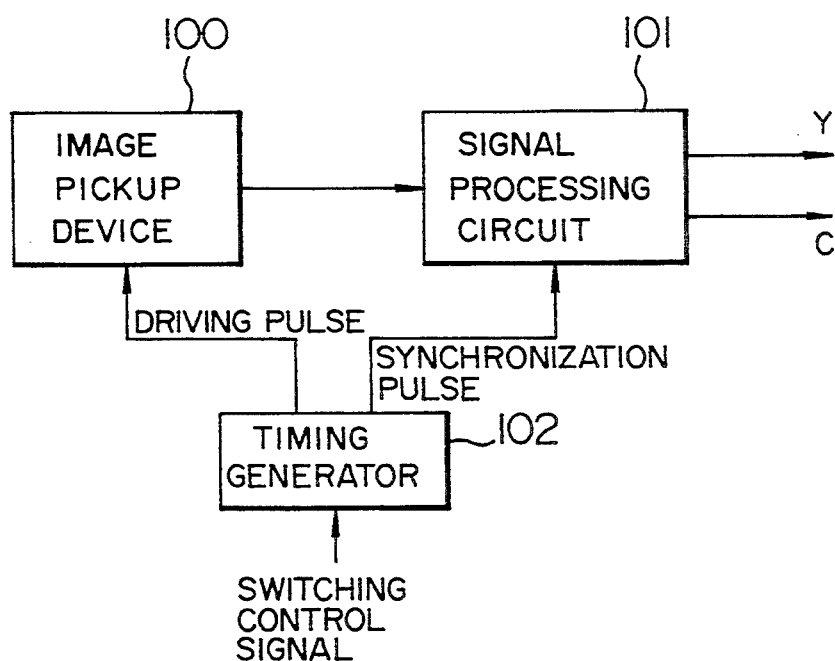
FIGS. 4A and 4B illustrate the structure and operation of a camera unit, respectively.
Figure 4B:
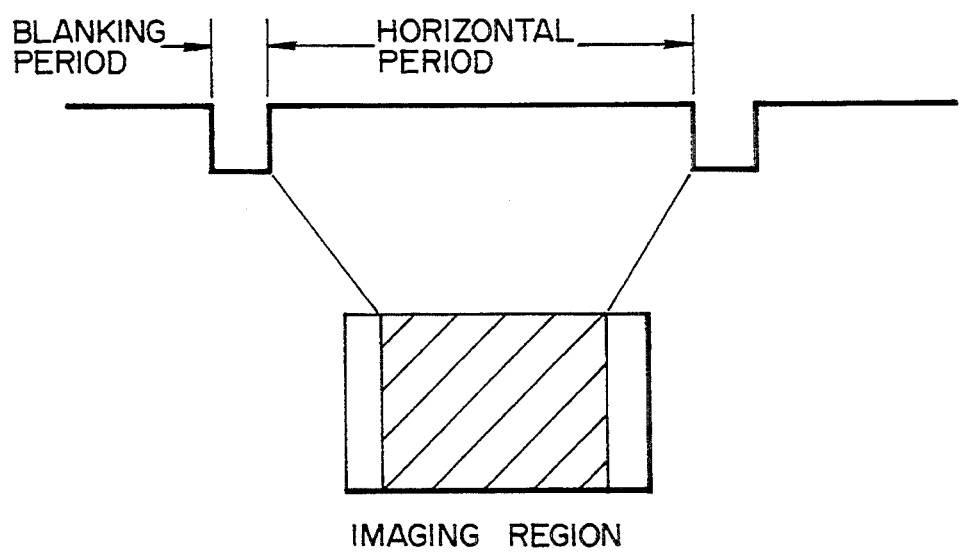

FIG. 4A is a block diagram of the camera unit 1 which is capable of horizontal time compression while FIG. 4B shows the relationship between horizontal scanning time and aspect ratio.

In FIG. 4A, a timing generator 102 generates a drive pulse for an image pickup device 100 and a synchronization pulse for a signal processing circuit 101. The repetition period of the drive and synchronization pulses changes depending on the switching control signal. When the switching control signal is low, the repetition period is such that a hatched portion of the imaging region shown in FIG. 4B corresponding to the aspect ratio of 4:3 is read out horizontally in one horizontal scanning time in the NTSC system. The non-hatched portion is required to be read out in the horizontal blanking interval. When the switching control signal is high, the repetition period is such that the overall area including the non-hatched portion of the imaging region of FIG. 4B corresponding to the aspect ratio of 16:9 is read out horizontally in one horizontal scanning time in the NTSC system. The timing generator 102 may be composed of a variable frequency clock or two clocks having different frequencies any one of which is selected by the switching control signal. While in FIG. 1 the switching control signal to the signal switching circuit 2 is fed directly from the aspect ratio switching circuit 6, it may be fed through the camera unit 1.

The view finder 3 and external apparatus 5 each select an aspect ratio of an image to be reproduced by the cathode ray tube CRT provided as a built-in display when the switching control signal becomes high through the signal switching circuit 2. This selects expansion and an aspect ratio of the video signal by, for example, changing the amplitude of a current fed to the vertical deflection circuit. A specified example for this case will be described with respect to FIGS. 5 and 6. Alternatively, the amplitude of a current fed to the horizontal deflection circuit may be changed.

Figure 5:
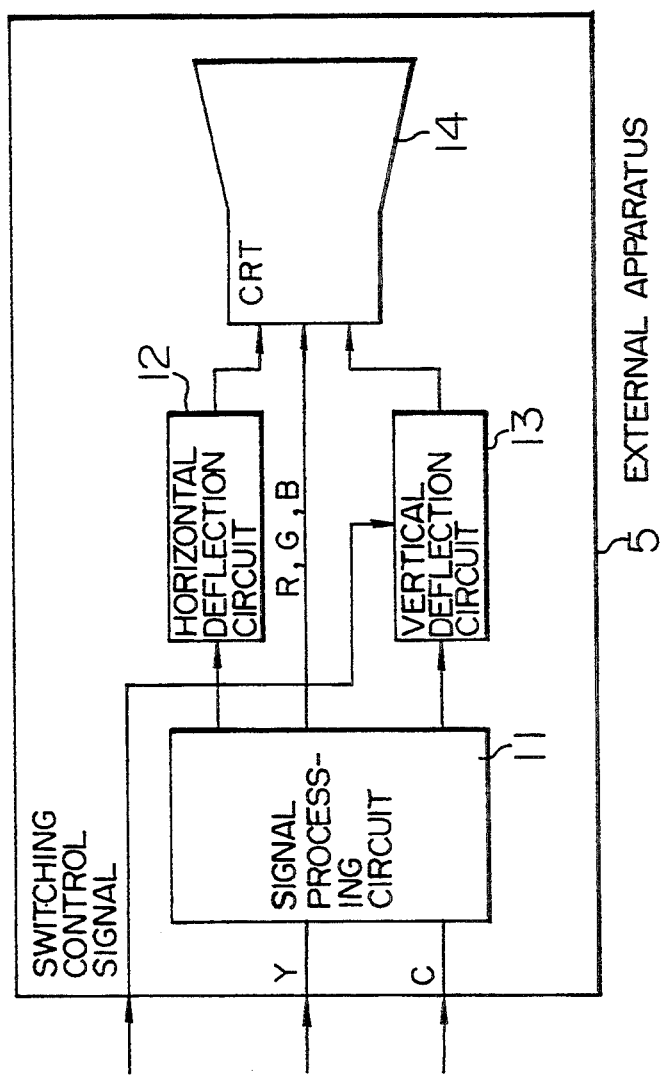
FIG. 5 is a schematic circuit diagram of an external apparatus.

FIG. 5 shows an illustrative structure of the circuit of the external apparatus 5 in which reference numeral 11 denotes a signal processing circuit; 12, a horizontal deflection circuit; 13, a vertical deflection circuit; and 14, a CRT.

Y- and C-signals are converted by the signal processing circuit 11 to a red (R), a green (G), a blue (B) signal, which are then output to the CRT 14. In order to provide these signals to the target positions on the CRT, the horizontal and vertical deflection circuits 12 and 13 control the signals.

FIGS. 6A-6D illustrate the selection of a aspect ratio by the vertical deflection circuit 12. FIGS. 6A and 6B relate to the selection of an aspect ratio of 4:3. The image is projected to a hatched area on the CRT. When the switching control signal becomes high, the amplitude of the current is reduced in the vertical deflection circuit of the CRT, as shown in FIG. 6C, so that the deflection angle in the vertical direction becomes smaller to thereby achieve an aspect ratio of 16:9. The principles are the same also in the view finder 3, and description thereof will be described later. The view finder 3 requires no chrominance signal in the monochrome display while it requires the chrominance signal in the color display, of course.

In the magnetic recording/reproducing circuit 4, the switching control signal is required to be stored at any location in the recording medium and detected in reproduction. Now, recording and detecting the switching control signal as a change of the duty cycle of the CTL signal will be described herein.

Figure 7:
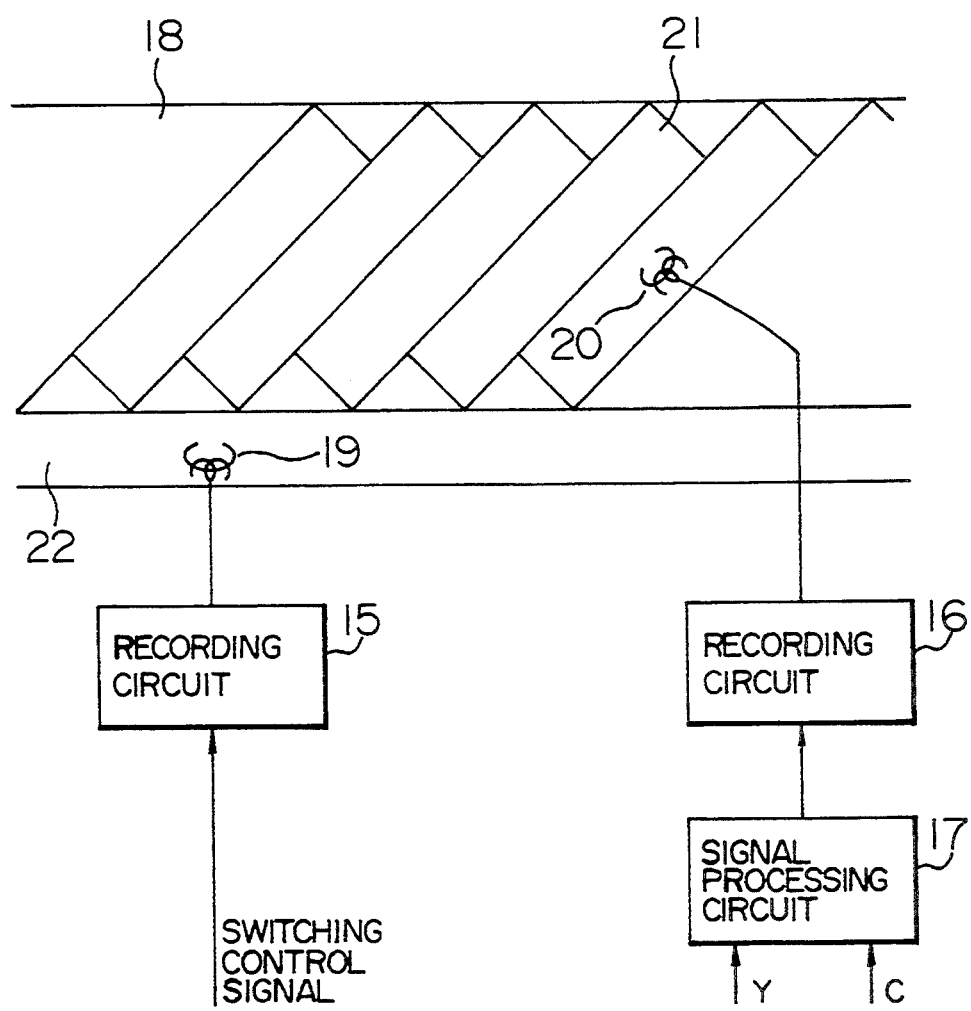
FIG. 7 is a diagram of a magnetic recording circuit.

In FIG. 7, reference numerals 15, 16 denote a recording circuit; 17, a signal processing circuit; 18, a magnetic tape; 19, 20, a head; 21, a recording track; and 22, a linear track. The Y- and C-signals are added in the signal processing circuit 17 and recorded on a magnetic tape 18 through the recording circuit 16 and the head 20. While recording is made in the form of the magnetic truck 21, the recording circuit 15 and head 19 record a rectangular-wave CTL signal on the linear track 22 such that it can be correctly read out in reproduction. At this time, the recording circuit 15 uses a duty cycle of 1:1 when the control signal is low and a duty cycle of 4:1 when the control signal is high.

Figure 8A:
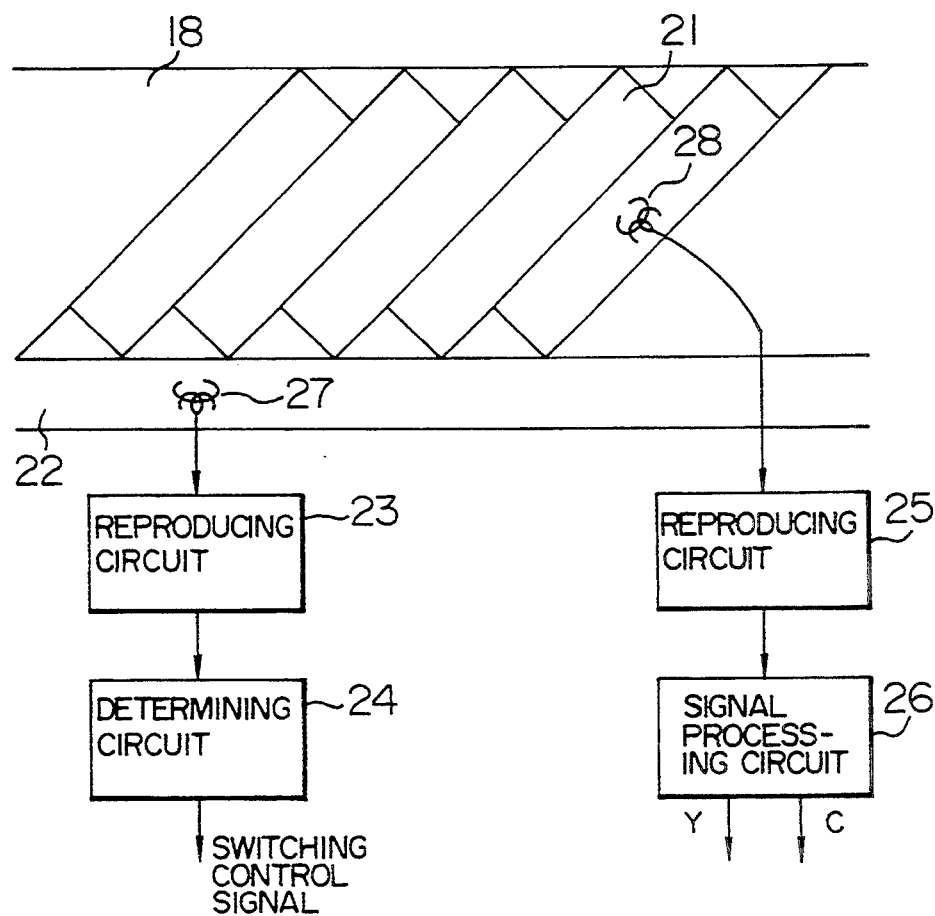
FIGS. 8A–8B respectively show a schematic diagram of a magnetic reproducing circuit and the waveform of the switching control signal in recording/reproduction.
Figure 8B:
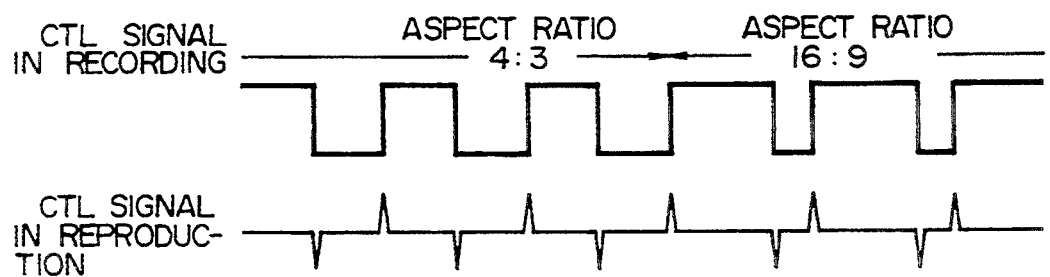

Reproduction operation will be described with reference to FIGS. 8A and 8B. In FIG. 8A, the video signal recorded on the recording track 21 of the magnetic tape 18 is reproduced by the head 28 and the reproducing circuit 25 and separated by the signal processing circuit 26 into the Y- and C-signals. In that case, the CTL signal recorded on the linear track 21 is read out by the head 27 and reproducing circuit 23 such that the video signal on the recording track 21 can be read out accurately and that a switching control signal is generated from the duty cycle of the CTL signal in a determining circuit 24. FIG. 8B shows the CTL signal in recording and reproduction.

As described above, the switching control signal is recorded and reproduced together with the video signal, so that the use of this recorded switching control signal achieves automatic selection of an aspect ratio of the view finder 3 and external apparatus 5 in reproduction.

As described above, according to the present embodiment, only the selection of the aspect ratio by the cameraman in the video camera automatically changes the aspect ratio of a device connected to the video camera. While in the present embodiment the switching control signal is illustrated as a separate one, the switching control signal may be superimposed on the video signal, for example, by adding a DC offset to the video signal.

Another embodiment will be described with reference to FIGS. 9 and 10. In the present embodiment, the timing of switching the aspect ratio by the switching control signal is synchronized with the vertical flyback interval to suppress possible disturbances in the video signal involved in the switching operation.

Figure 9:
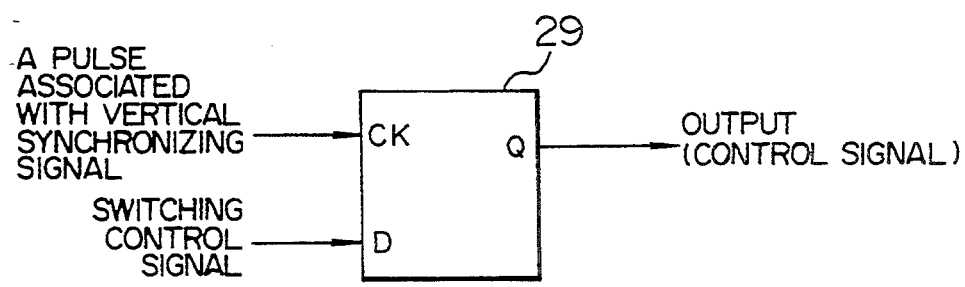
FIG. 9 is a schematic diagram of a circuit which generates a synchronous switching control signal.
Figure 10:
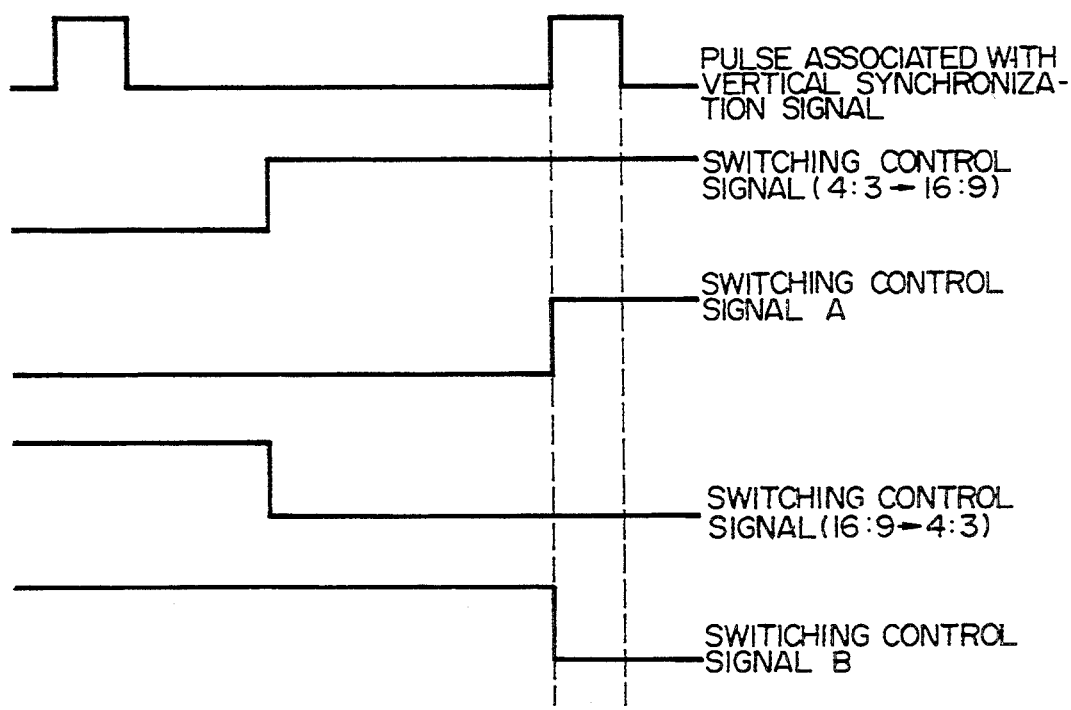
FIG. 10 is a timing chart indicative of the synchronous switching control signal.

FIG. 9 shows the structure of the circuit which generates a synchronous control signal. Reference numeral 29 denotes a D flip-flop. The pulse timing in FIG. 9 is shown in FIG. 10. The same signal name is used in common in FIGS. 9 and 10.

Assume that the operator has switched the aspect ratio during the image interval or non-blanking interval. At this time, the D flip-flop 29 receives the switching control signal which is high at its D input terminal. Since the clock input CK is low, the output of the flip-flop remains low. By applying to a CK terminal a pulse associated with the vertical synchronous signal which becomes high during the vertical flyback interval, the output of the D flip-flop 29 is synchronized with the pulse associated with the vertical synchronous signal to thereby provide a control signal A, which is fed as the switching control signal to the camera unit 1 and signal switching circuit 2 of FIG. 1 to synchronize the signal switching timing of the switching control signal with the vertical flyback interval. When the aspect ratio is switched from 16:9 to 4:3, a switching control signal B synchronous with a pulse associated with the vertical synchronizing signal is obtained.

Since in the present embodiment the aspect ratio is switched during the vertical flyback interval, the aspect ratio is not changed during the video interval, so that no disturbances in the image occur.

Figure 11:
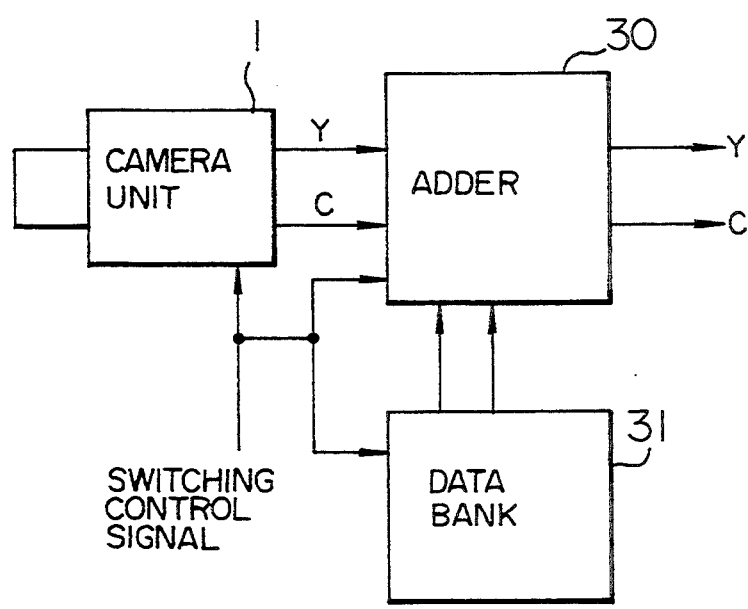
FIG. 11 is a schematic diagram of a character adder.

Another embodiment will be described below with reference to FIG. 11. In the present embodiment, the character or graphic data added to the video signal is switched in accordance with the aspect ratio to thereby add character or graphic data in good harmony. In FIG. 11, reference numeral 30 denotes an adder and 31 a data bank. The adder 30 adds data on the date from the data bank 31 to the Y and C signals output from the camera unit 1. The data bank 31 outputs to the adder 30 data corresponding to the selected aspect ratio in accordance with the switching control signal, so that the appropriate character or graphic data is added automatically at a target aspect ratio.

According to the embodiment, when the cameraman switches the aspect ratio in the video camera, the aspect ratio of all the devices connected to the video camera is switched automatically to a desired aspect ratio.

Figure 12:
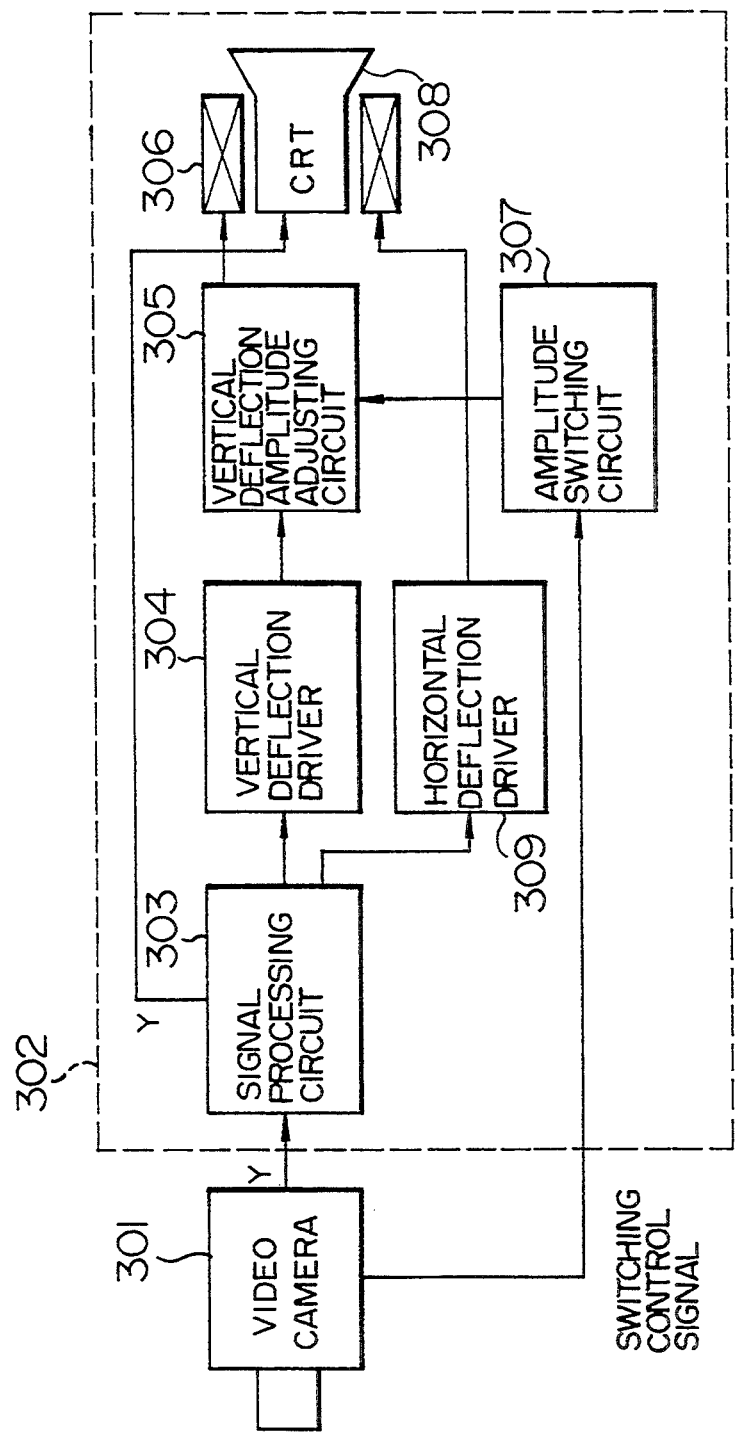
FIG. 12 is a block diagram of one embodiment of an electronic view finder according to the present invention.

One embodiment of the electronic view finder according to the present invention will then be described with reference to FIG. 12 in which reference numeral 301 denotes a video camera which has a built-in VTR (hereinafter referred to as a video camera only); 302, an electronic view finder; 303, a signal processing circuit; 304, a vertical deflection drive circuit; 305, a vertical deflection amplitude adjusting circuit; 306, a vertical deflection coil; 307, an amplitude switching circuit; 308, a cathode ray tube (CRT); and 309, a horizontal deflection drive circuit.

When the aspect ratio of the NTSC signal is 4:3, the video signal picked up by the video camera 301 is input to the electronic view finder 302. The input signal drives the signal processing circuit 303, vertical and horizontal deflection drive circuits 304, 309. The vertical amplitude of the drive signal from the vertical deflection drive circuit 304 is adjusted such that a predetermined aspect ratio is obtained by the vertical amplitude adjusting circuit 305 to drive the vertical deflection coil 306 to thereby display the image on CRT 308.

When the aspect ratio is switched to 16:9, the video camera 301 outputs a switching control signal which switches the aspect ratio from 4:3 to 16:9 to thereby operate the amplitude switching circuit 307 in the electronic view finder 302. The operation of the amplitude switching circuit 307 changes the setting of the vertical deflection amplitude adjusting circuit 305 such that the aspect ratio becomes 16:9.

Since the vertical deflection waveform (current waveform) and the display of the screen on the CRT are similar to those in FIGS. 6A–6D, description will be made with reference to these Figures. The hatched portions of FIGS. 6B, 6D show the portions of the CRT screen where the picked-up image appears. The vertical deflection current waveform at that time is shown to the left side of the hatched portion with the axis of abscissa representing time and the axis of ordinate representing the current value.

FIGS. 6A, 6B show the case where the aspect ratio is 4:3; FIGS. 6C, 6D the case where the aspect ratio is changed from 4:3 to 16:9. FIG. 6C shows the vertical deflection current waveform where the solid line shows the case for 16:9 while the broken lines show the case for 4:3. When the aspect ratio is changed from 4:3 to 16:9 in this way, the picture is compressed vertically to reproduce on the CRT screen an image intended by the cameraman.

Figure 13:
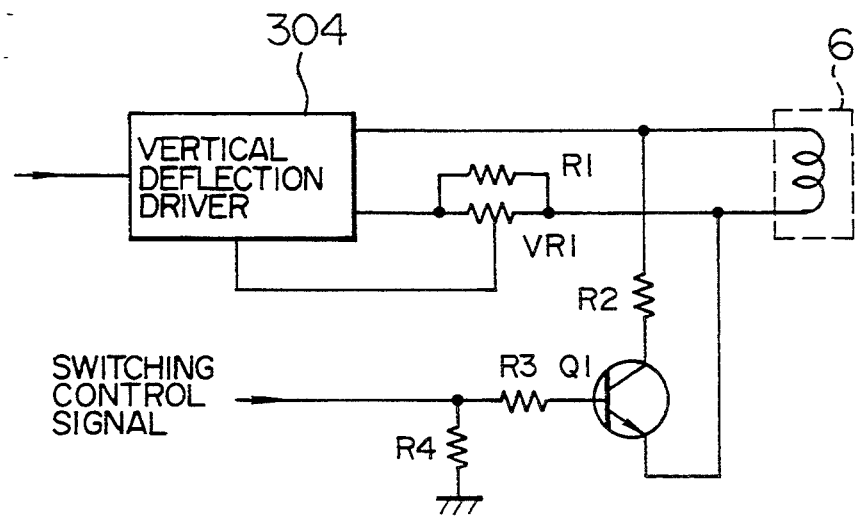
FIG. 13 is a schematic diagram of a circuit indicative of one embodiment of the aspect ratio switching circuit.
Figure 14:
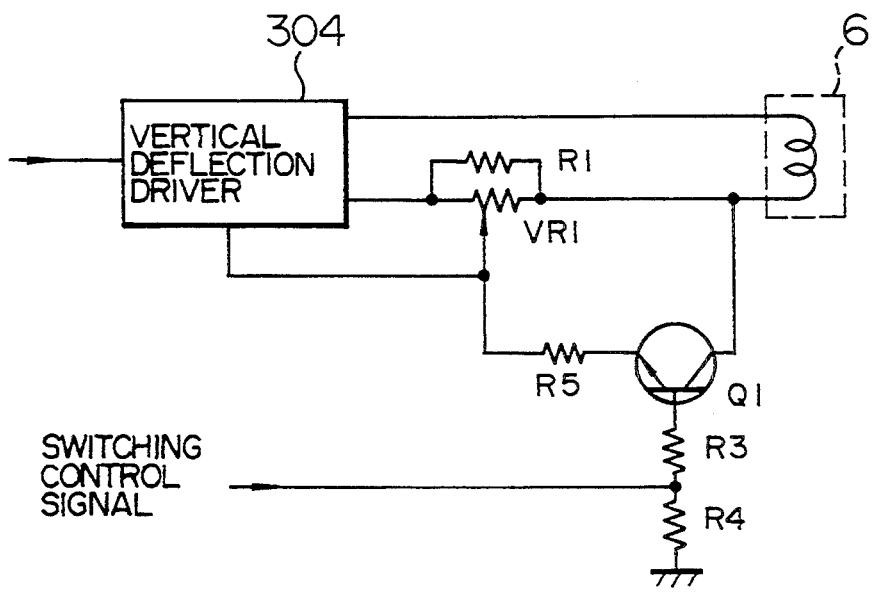
FIG. 14 is a schematic diagram of a circuit indicative of another embodiment of the aspect ratio switching circuit.

FIGS. 13 and 14 each shows an embodiment of the switching circuit which switches the aspect ratio between 4:3 and 16:9.

In FIG. 13, a vertical deflection waveform is produced by the vertical deflection driver 304 to drive the vertical deflection coil 306. A variable resistor VR1 adjusts the amplitude of the vertical deflection waveform such that the aspect ratio of the image becomes 4:3 on the CRT. At this time, the switching control signal is low, so that the base of a transistor Q1 is grounded through resistors R3 and R4, and hence the transistor is off and resistor R2 does not influence the vertical deflection circuit at all.

When the video camera issues a command to switch the ratio to 16:9, the switching control signal becomes high, so that the base of the transistor Q1 becomes high through the resistor R3 to thereby turn on Q1. At this time, the resistor R2 is connected in parallel with the vertical deflection coil 306, and the vertical deflection current is separated into current portions which flow through the vertical deflection coil 306 and resistor R2, so that the vertical deflection current flowing through the vertical deflection coil 306, the vertical deflection amplitude and the aspect ratio change. If the resistor R2 is selected such that the vertical deflection amplitude when the resistor R2 is connected in circuit is for an aspect ratio of 16:9, the switching control signal can switch the aspect ratio between 4:3 and 16:9.

In the embodiment of FIG. 14, the aspect ratio is set to 4:3, at which time the transistor Q1 is off, which is the same as in FIG. 13. When the switching control signal from the video camera becomes high, the base of the transistor Q1 becomes high through the resistor R3 to thereby turn on Q1. At this time, the resistor R5 is connected between the center tap of the variable resistor VR1 and the terminal of the vertical deflection coil connected to the collector of Q1. Thus, the resistance value between the center tap of VR1 and the vertical deflection coil terminal of the collector side decreases to thereby increase a quantity of feedback to the vertical deflection driver 4, so that the vertical deflection driver 4 decreases a vertical deflection current and the vertical deflection amplitude. At this time, if the resistor R5 is selected such that the aspect ratio is 16:9, the switching control signal can switch the aspect ratio between 4:3 and 16:9.

In FIGS. 13 and 14, a picture of any aspect ratio can be produced by replacing the resistors R2 and R5 with variable ones.

While in the embodiment the use of the monochrome cathode ray tube as CRT 308 has been described, arrangement should be such that in the use of a color cathode ray tube the signal processing circuit 303 receives a chrominance signal from the video camera 301 in addition to the luminance signal, produces a R (red), G (green) and B (Blue) signals from the luminance and chrominance signals, and feeds them to the CRT 308.

Another embodiment of the electronic view finder according to the present invention will be described with reference to FIG. 15. While in the FIG. 12 embodiment the cathode ray tube is used as a display device, a liquid crystal display (LCD) is used in the embodiment of FIG. 15.

In FIG. 15, reference numeral 303' denotes a signal processing circuit which receives a luminance signal from a video camera 301 which has a built-in a VTR, and separates the horizontal and vertical synchronizing signals from the luminance signal. Reference numeral 310 denotes a controller which is provided with a horizontal shift register 311, a vertical shift register 312 and a control circuit 313 which controls these registers. Reference numerals 304' and 309' denote a vertical and a horizontal driver which are controlled by a vertical and a horizontal shift register 312 and 313, respectively, in the controller 310. Reference numeral 308' denotes an LCD device having an aspect ratio of 4:3. Reference numeral 315 denotes a vertical counter which receives an aspect ratio switching control signal from the video camera 301 and the horizontal and vertical synchronizing signals to control the control circuit 313 of the controller 310.

In operation, when the aspect ratio is switched from 4:3 to 16:9 by the switching control signal, the vertical counter 315 counts the number of horizontal synchronizing signals to detect a scan start and a scan end position on the display area corresponding to the aspect ratio of 16:9 on the LCD 308' to thereby control the vertical driver 304' and hence the on/off (start/stop) operations of the vertical driver 304' to the received video signal. If the number of horizontal scanning lines on the LCD 308' is, for example 220, when the aspect ratio is 4:3, an image which has a proper proportion and therefore which is not vertically long in excess is obtained on the LCD 308' by thinning out the number of horizontal scanning lines to 165 when the aspect ratio is switched to 16:9. In order to achieve this, the vertical counter 315 counts horizontal synchronizing signals in such a manner that each time the vertical counter 315 counts, for example, three horizontal synchronizing signals, it does not count the next one horizontal synchronizing signal. The vertical counter 315 is reset with a vertical synchronizing signal. By such control operation, the aspect ratio of 4:3 is switched to 16:9.

When a color LCD is used as the LCD 308', the signal processing circuit 303' receives the luminance signal as well as the chrominance signal from the video camera 301 to generate an R, a G and a B signal and feeds them to the LCD 308'.

While in the above embodiments the aspect ratio of the electronic view finder is illustrated as being switched by correcting the vertical driver side, it may be switched by correcting the horizontal driver side.

According to the present invention, the aspect ratio in the video camera having a built-in VTR and the finder can be switched by a simple circuit in accordance with the switching control signal from the video camera.

What is claimed is:

1. A video camera comprising:
   a generating means for generating an aspect ratio control signal which switches an aspect ratio of a displayed image to one of at least two different aspect ratios;

camera means responsive to the aspect ratio control signal for changing a horizontal read-out region and a read rate for an output video signal read out from the camera means;

a recording/reproducing means for selectively recording the output video signal read out from said camera means together with the aspect ratio control signal and reproducing the recorded video and control signals as a reproduced video signal and a reproduced control signal;

a video output terminal (1) for receiving one of (i) the output video signal from said camera means and (ii) the reproduced video signal from said recording-/reproducing means and (2) for feeding the received video signals to an external apparatus;

a control signal terminal (1) for receiving one of (i) the aspect ratio control signal from the generating means and (ii) the reproduced control signal from the recording/reproducing means and (2) for feeding the received control signal to the external device;

signal switching means connected to said camera means, said recording/reproducing means, and said output video terminal and control signal terminal for selectively (1), in a camera mode, feeding the output video signal from said camera means to said recording/reproducing means and said video output terminal and the aspect ratio control signal from the generating means to the control signal terminal and (2), in a reproduction mode, feeding said reproduced video and control signals from said recording/reproducing means to said video output and control terminals, respectively.

2. A video camera according to claim 1, wherein when said video camera is in a camera mode where the larger one of said two different aspect ratios is used, said camera means expands the horizontal read-out region compared to a read-out region with smaller one of the different aspect ratios, and increases the read-out speed compared to that for the smaller aspect ratio.

3. A video camera according to claim 1, wherein said control signal generating means comprises means for synchronizing the timing of switching the control signal with a time in the vertical flyback interval of the displayed image.

4. A video camera according to claim 1, further comprising data storage means for outputting character or graphic data in accordance with the aspect ratio corresponding to the control signal, and means for adding the data from said data storage means to the video signal read out from said camera means.

5. A video camera according to claim 1, further comprising an electronic view finder connected to receive either the output video signal from said camera means and the control signal or the reproduced video signal including the control signal from said recording/reproducing means, said finder compressing and displaying the received output video signal or reproduced video signal in a vertical direction at a ratio corresponding to the larger one of the two different aspect ratios when the larger one of the aspect ratios is designated by the received control signal.

6. The video camera according to claim 5 wherein the electronic view finder includes:
a signal processing circuit for receiving and processing the output video signal from said video camera means;
a vertical deflection driver for generating a vertical deflection drive signal, the vertical deflection driver being connected to said signal processing circuit;
a horizontal deflection drive for generating a horizontal deflection drive signal, the horizontal deflection driver being connected to said signal processing circuit;
an amplitude switching circuit for setting in accordance with the control signal an amplitude of the vertical deflection drive signal from said vertical deflection driver; and
a cathode ray tube connected to said signal processing circuit, the amplitude switching circuit, and said horizontal deflection driver.

7. The video camera according to claim 5 wherein the electronic view finder further includes:
video signal processing means including means for separating a horizontal and a vertical synchronizing signal from the output video signal from said camera means;
a displaying means for converting the video signal into a human viewable display;
horizontal drive means responsive to said video signal processing means for driving said displaying means horizontally;
a compressing means responsive to said video signal processing means for vertically compressing the video signal at a ratio depending on the control signal; and
vertical driver means responsive to said compressing means for driving said displaying means vertically.

8. The video camera according to claim 7, wherein said displaying means includes a liquid crystal display.

* * * * *